June 18, 1963    P. ZAHRÁDKA ET AL    3,093,987
CONTROL DEVICE FOR THE PATTERN DRUM OF A KNITTING MACHINE
Filed Dec. 8, 1960    8 Sheets-Sheet 1

INVENTORS
Pavel Zahrádka & Miloslav Losert
BY
Richard [signature] Agt

June 18, 1963  P. ZAHRÁDKA ET AL  3,093,987
CONTROL DEVICE FOR THE PATTERN DRUM OF A KNITTING MACHINE
Filed Dec. 8, 1960  8 Sheets-Sheet 3

INVENTORS
Pavel Zahrádka
Miloslav Losert
BY
Richard Low
Agt.

June 18, 1963  P. ZAHRÁDKA ET AL  3,093,987
CONTROL DEVICE FOR THE PATTERN DRUM OF A KNITTING MACHINE
Filed Dec. 8, 1960  8 Sheets-Sheet 4

INVENTORS
Pavel Zahrádka & Miloslav Losert
BY
Richard Low
Agt

June 18, 1963   P. ZAHRÁDKA ET AL   3,093,987
CONTROL DEVICE FOR THE PATTERN DRUM OF A KNITTING MACHINE
Filed Dec. 8, 1960   8 Sheets-Sheet 6

INVENTORS
Pavel Zahrádka & Miloslav
BY   Losert

INVENTORS
Pavel Zahrádka & Miloslav Losert
BY Richard ...
Agt

United States Patent Office 3,093,987
Patented June 18, 1963

3,093,987
CONTROL DEVICE FOR THE PATTERN DRUM OF A KNITTING MACHINE
Pavel Zahrádka and Miloslav Losert, Trebic, Czechoslovakia, assignors to Sdruzeni podniku textilniho Strojirenstvi, Liberec, Czechoslovakia
Filed Dec. 8, 1960, Ser. No. 74,518
Claims priority, application Czechoslovakia Dec. 12, 1959
9 Claims. (Cl. 66—154)

The present invention relates to a control device for the pattern drum of a knitting machine, particularly of a two-cylinder multiple-feed machine for the production of patterned hosiery. In a machine of the afore-mentioned type, the pattern drum has two separate parts, which are coaxially mounted and provided with respective ratchet wheels for independent or joint indexing of the two parts over one or two teeth.

In a known knitting machine of the two-cylinder multiple-feed type for the production of patterned hosiery which is equipped with an axially split pattern drum, only one part of the pattern drum is indexed forward during each angular displacement of the needle cylinder which has a single cam. Only upon further displacement of the needle cylinder, the other part of the drum is indexed. Also, both parts of the pattern drum may be indexed simultaneously. A reliable engagement of selector levers with the butts of pattern jacks on this machine requires, however, the use of two sets of levers having different lengths, one set operating in front of, and the other set behind the butts of the pattern jacks. The use of two sets of levers having different lengths or offset relative to one another is undesirable because of the limited space available in a multiple-feed machine equipped with a needle cylinder of small diameter and comprising a plurality of pattern devices.

It is an object of the present invention to provide an improved control device for an axially split pattern drum which enables first one half of a set of superposed selector levers and thereafter the other half to engage the butts of pattern jacks arranged on a needle cylinder in parallel and diagonal rows during a single turn of the cylinder. A phase shift in the engagement of the selector levers during a single rotary movement of the needle cylinder is advantageous because a clean pattern and a reliable operation of the machine are achieved, and because the presser faces of the levers do not strike against the jack butts. It is a further advantage of this arrangement that the size of all levers is identical which enables a relatively large number of pattern devices to be arranged around a needle cylinder of small diameter. This makes possible the production of a great variety of patterns, and the speed of operation of the knitting machine can also be increased because the engagement of the several levers with jack butts takes place at different times.

An essential feature of the present invention is a phase shift between the positive and independent indexing mechanisms which move the two parts of the pattern drum through an angle corresponding to one or two axial rows of pattern pins in the course of one revolution of the needle cylinder. These mechanisms include respective rollers provided on two kick levers which roll along corresponding cams on the needle cylinder. The operative faces of the cams are offset a predetermined angle.

Other features of the invention will become apparent from the following disclosure when taken in conjunction with the annexed drawings, which represent a preferred embodiment of the invention, and in which.

Figure 1:
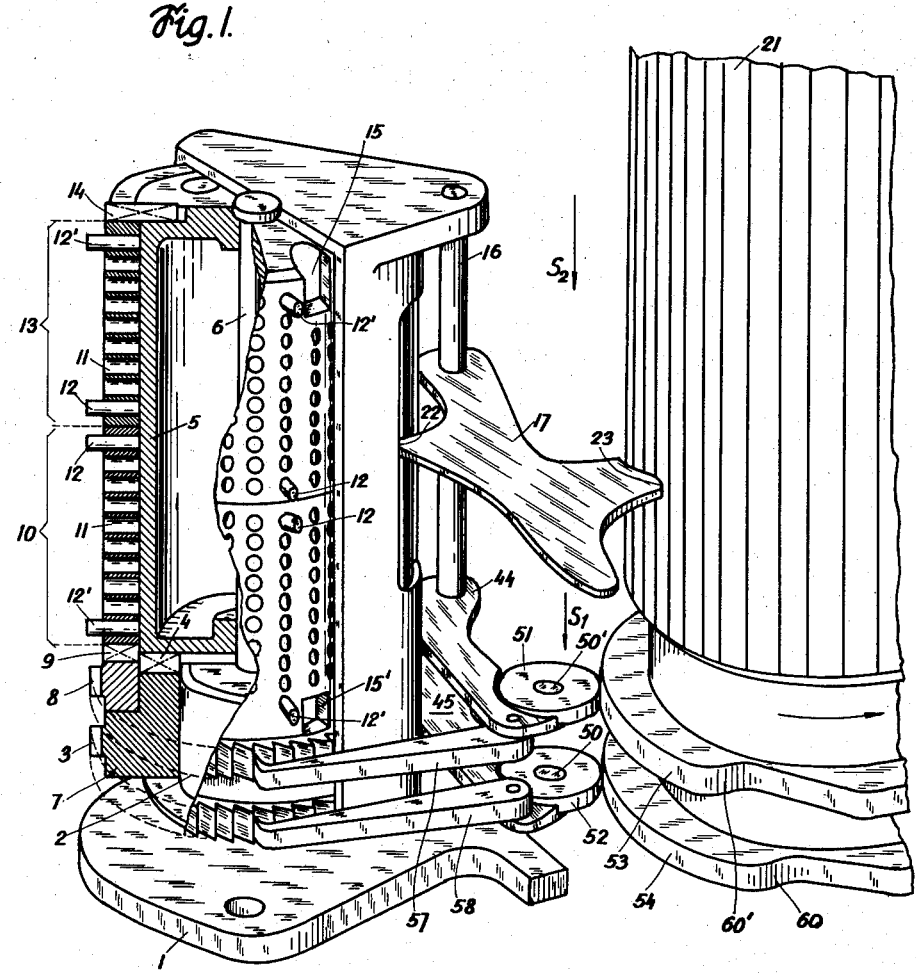
FIG. 1 is a fragmentary front-elevational view of a circular knitting machine equipped with a control device of the invention, the pattern drum of the knitting machine and certain elements of the control device being partly shown in section, and other elements of the control device being omitted for the sake of clarity.
Figure 5:
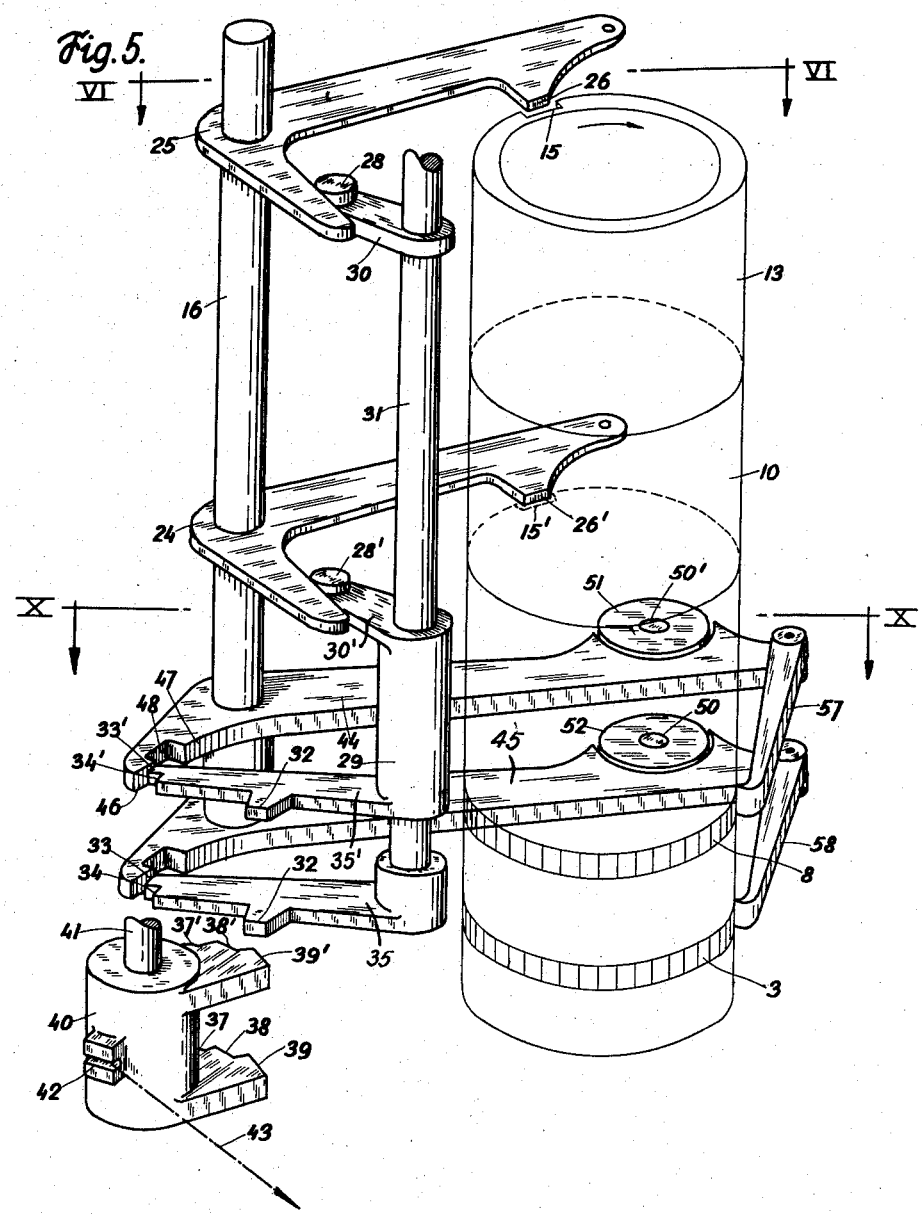
FIG. 5 illustrates the cooperation of certain elements of the control device partly shown in FIG. 1, the view being in side elevation.
Figure 8:
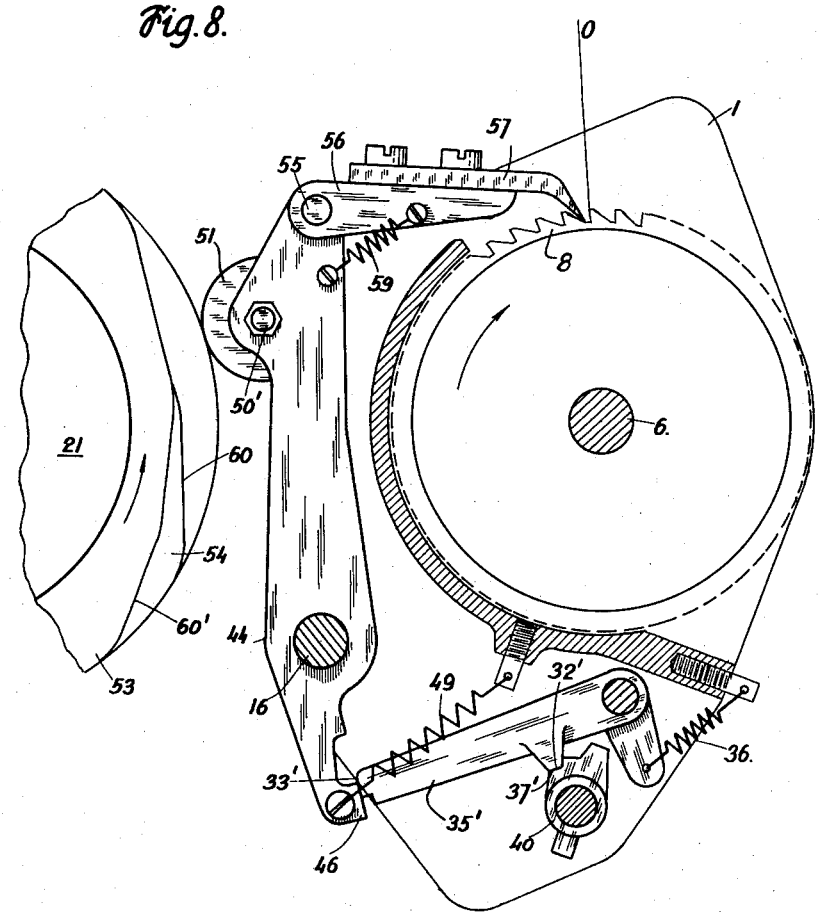
Figure 9:
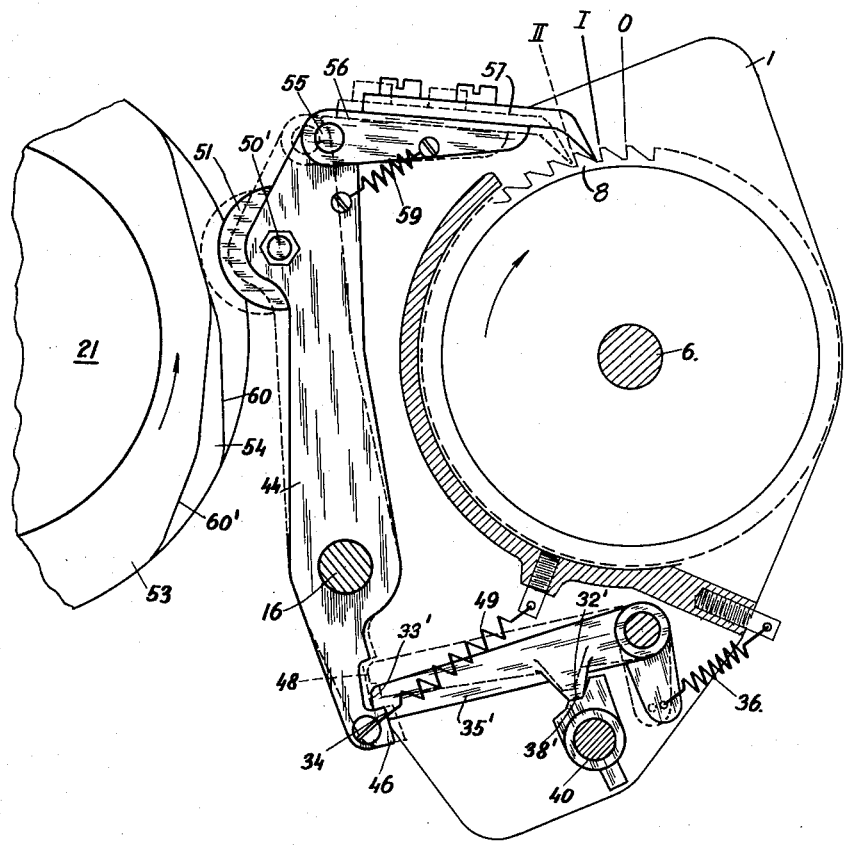
Figure 10:
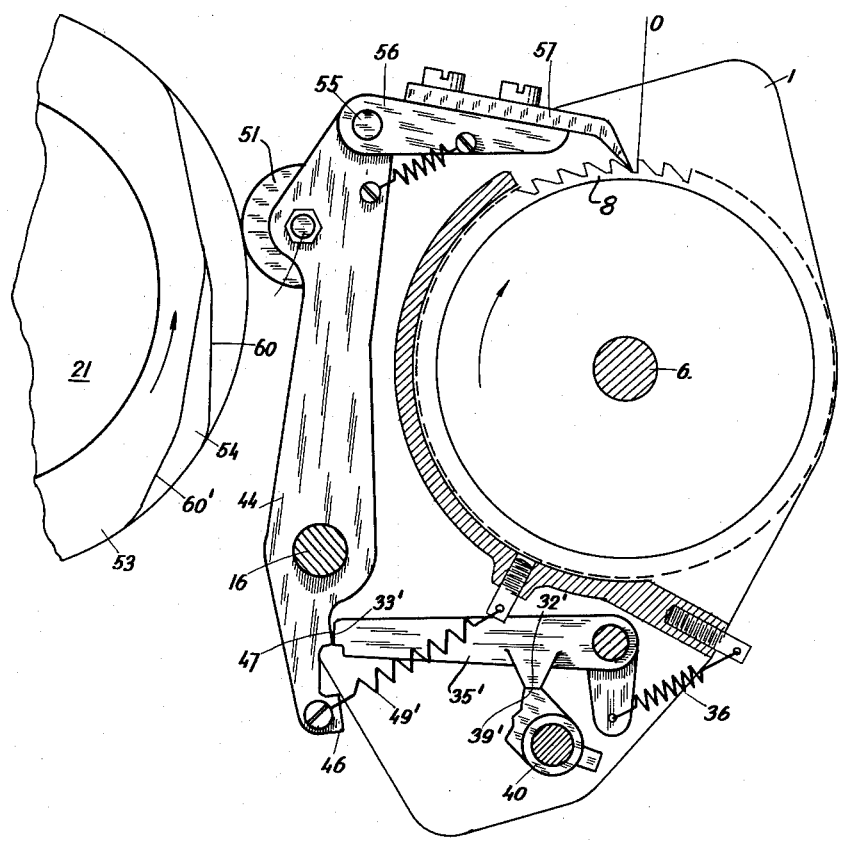

FIGS. 8, 9, and 10 show portions of the apparatus of FIG. 1 in plan section substantially on the line X—X in FIG. 5, and in three different operational positions.

Referring now to the drawing in detail and initially to FIG. 1, there is shown a short shaft 2 fixed on the machine frame 1. A ratchet wheel 3 is rotatably mounted on the shaft 2 and fixed by a key 4 to a cylindrical casing 5 which is centered on a fixed vertical pivot pin 6. Mounted for free rotation on a stepped cylindrical portion 7 of the ratchet wheel 3 is a second ratchet wheel 8 which is fixed by means of a key 9 to the lower part 10 of an axially split pattern drum. The lower part 10 of the drum is rotatably mounted on the casing 5 and both parts of the drum are provided with radial openings 11 for pattern pins 12, 12'. The openings 11 are aligned in circumferential and axial rows. The spacing of the teeth from each other and from the axis of rotation is the same for both ratchet wheels 3 and 8. The upper part 13 of the pattern drum is fixed by means of a key 14 to the casing 5.

The radial faces of the pattern drum parts 10, 13 remote from the other part are provided with respective recesses 15, 15' extending into an axially terminal circumferential row of openings 11 which hold pins 12'. A shaft 16 is secured in the frame 1 parallel to the pin 6 and pivotally carries a set of selector levers 17 of identical size, only one such lever being shown in the drawing. Actually, the number of said selector levers corresponds to the number of rows of butts 18 of pattern jacks 19 (FIGS. 3 and 4), which are mounted for rocking movement in axial grooves 20 of the needle cylinder 21.

Figure 4:
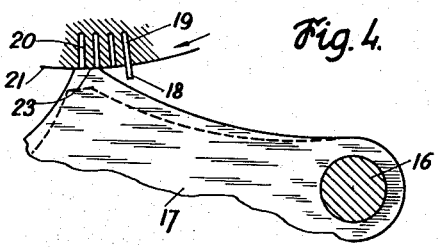
FIG. 4 shows a detail of the apparatus of FIG. 1 in plan view taken substantially in the direction of the arrow $S_2$.
Figure 6:
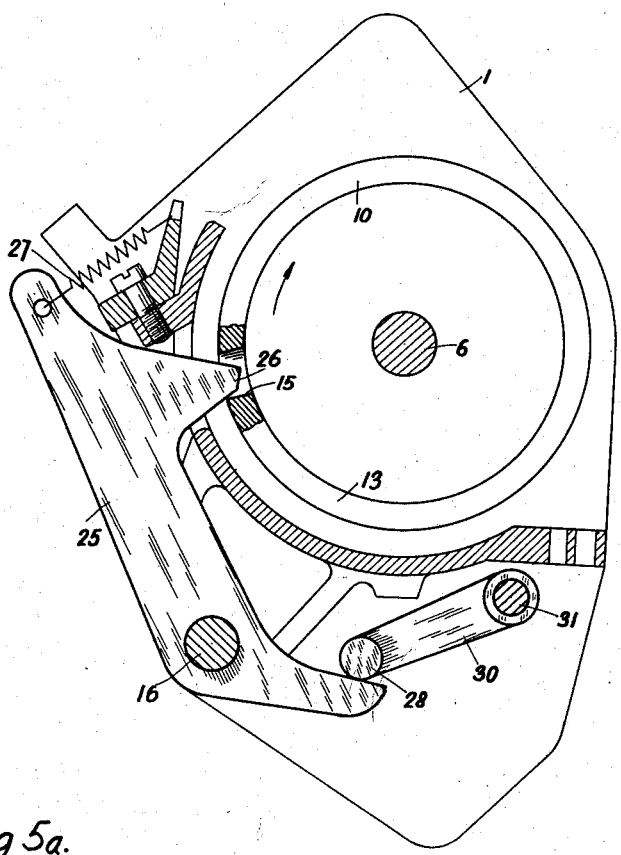
FIGS. 6 and 7 show portions of the control device of FIG. 1 in plan section substantially on the line VI—VI in FIG. 5 and in two different operational positions.
Figure 7:
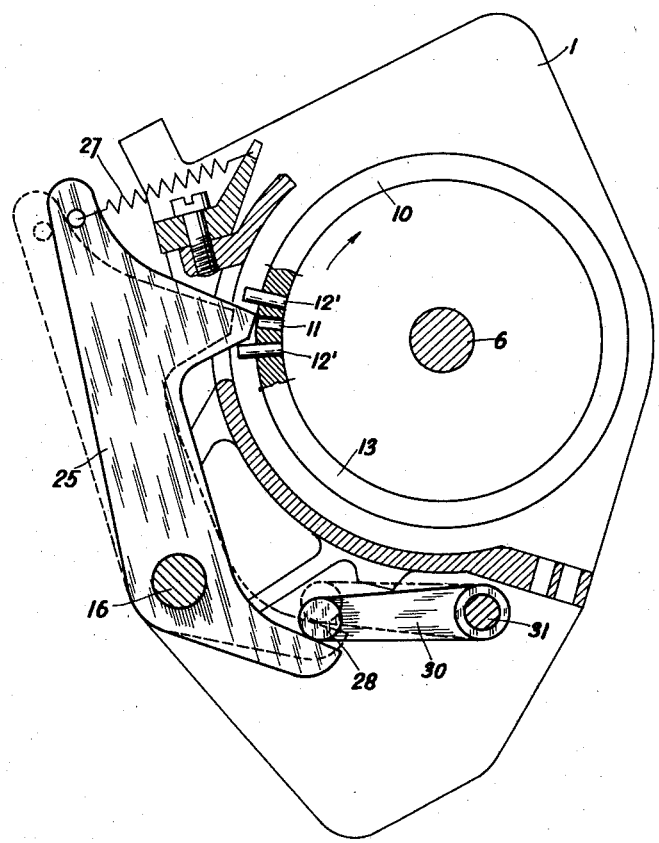

A cam face 22 (FIG. 1) of each lever 17 cooperates with pattern pins 12, and a presser face 23 on each lever 17 with the butts 18 of jacks 19 (FIG. 4). At the level of the aforementioned axially terminal rows of openings 11 with pins 12' in both parts 10, 13 of the drum (FIG. 1), identical indexing control levers 24, 25 (FIG. 5) are rotatably mounted on the shaft 16 in such a manner that projections 26, 26' on the respective longer arms of both levers are urged by respective springs 27 (FIG. 7) toward the surface of the corresponding pattern drum part 10, 13 and into engagement with the pins 12' or the recesses 15, 15' (FIG. 6). The shorter arms of the levers 24, 25 respectively cooperate with pins 28, 28' on crank arms 30, 30' (FIG. 5). The crank arm 30 is fastened to a shaft 31, the arm 30' to a tubular shaft 29 coaxially rotatable on the shaft 31.

Another arm 35 on the shaft 31 is provided with a transverse projection 32 and has a notch 34 at its free end 33. An arm 35' substantially identical with the arm 35 is secured to the lower end of the shaft 29, and is also provided with a projection 32' and a notch 34' at its free end 33'.

The projections 32, 32' of the arms 35, 35' are held selectively in contact with the stepped cam faces 37, 38, 39 and 37', 38', 39' (FIG. 5) of a double control cam 40 by springs 36 (FIG. 8). The control cam 40 is rotatably mounted on the machine frame by a pivot 41. The faces of the control cam 40 are arranged in two sets occupying respective spaced radial planes, one set consisting of the cam faces 37, 38, 39, the other one of the faces 37', 38', 39'. The faces of each set are spaced a different distance from the axis of the pivot 41.

Figure 5A:
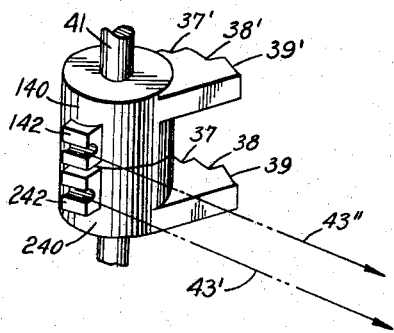
FIG. 5A shows a modified detail of the device of FIG. 5.

One end of a cable 43 is attached to a clip 42 on the control cam 40. The other end of the cable is attached to a non-illustrated lever, which cooperates with a non-illustrated operative segment of a main cam drum or with the operative members of a non-illustrated pattern chain of the knitting machine. As shown in FIG. 5A, the control cam 40 may be replaced by two single cams 140, 240, each of which cooperates independently with one of the arms 35, 35'. The two cams are respectively actuated by cables 43', 43" clamped by clips 142, 242 to the respective cams. As will presently become apparent, the provision of two cams permits one part only of the drum to be indexed while the other part of the drum is stopped for any desired period.

In the respective planes of rotary movement of the arms 35, 35', there are mounted indentical kick levers 44, 45 pivotable on the shaft 16. The shorter arm of each lever 44, 45 has a slanting contact face opposite a respective free end 33, 33' of an arm 35, 35'. The contact face has an outer portion 46 and an inner portion 47 separated by a recess 48. Respective springs 49 urge the free ends 33, 33' of the arms 35, 35' into engagement with the contact faces of the kick levers (FIG. 8).

Rollers 51, 52 are journaled respectively on pins 50, 50' of the kick levers 44, 45 and roll along the identical working profiles 60, 60' of corresponding cams 53, 54 fixedly secured to the needle cylinder 21 (FIG. 1). Two arms 56 are mounted for swinging movement on respective kick levers 44, 45 by means of pins 55, and carry adjustable pawls 57, 58 which are biased by springs 59 into respective engagement with teeth of the ratchet wheels 3, 8 (FIG. 8).

Figure 2:
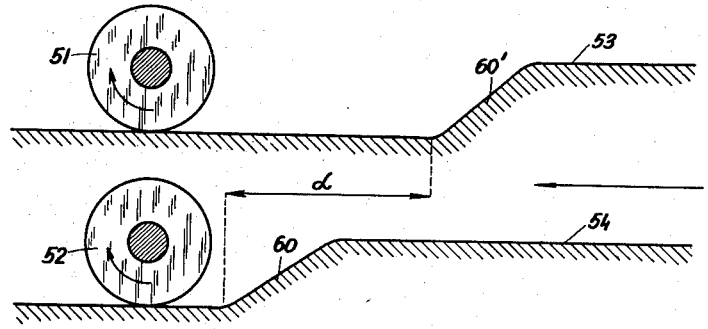
FIG. 2 shows detail features of the apparatus of FIG. 1 in a schematic plan view taken substantially in the direction of the arrow $S_1$, including cams which are shown in developed view.

For the purpose of achieving a phase shift in the indexing of the wheels 3, 8 by the pawls 57, 58, the working profiles 60, 60' of the two cams 53, 54 are offset by an angle $\alpha$ (FIG. 2). As a result of this arrangement, the selector levers 17 define between the jack butts 18, which form parallel and diagonal rows, two indentical rectangular spaces 61, 62 on the surface of the needle cylinder 21 which are offset relative to the cylinder axis by the angle $\alpha$ (FIG. 3) and are at two different levels of the needle cylinder 21. Each of the spaces 61, 62 is engaged by the pressure faces 23 of one half of the aforementioned lever 17 (FIG. 4).

The device described above operates as follows:

Before the patterned part of a stocking is knitted, both parts 10, 13 of the pattern drum are secured in their initial position by engagement of the projections 26, 26' of both indexing control levers 24, 25 with the recesses 15, 15' in the drum parts 10, 13 (FIGS. 5, 6). The transverse projection 32, 32' of each arm 35, 35' bears under pressure of a spring 36 against the corresponding cam face 37, 37' of the cam 40 nearest the axis of the pivot 41 (FIG. 8). The free end 33, 33' of the arms 35, 35' are engaged by the outer portions 46 of the contact faces of the corresponding kick levers 44, 45 under the action of the springs 49. The rollers 51, 52, which are carried by the kick levers, are out of reach of the cams 53, 54, so that the pawls 57, 58 are in their inoperative or advanced position O (FIG. 8).

When the knitting of the patterned part of the stocking is started, both parts 10, 13 of the drum are set to operate by the turning of the main cam drum of the machine, causing the non-illustrated lever to slide from the drum surface to a lower step of a non-illustrated operative segment.

The cable 43 which is secured to said lever and to the clip 42 of the control cam 40, is pulled in the direction of the arrow (see FIG. 5) and rotates the cam about the pivot 41 to a position in which the transverse projections 32, 32' of each arm 35, 35' bears against the corresponding central cam face 38, 38' of the double cam 40 (FIG. 9). The pivotal movement of the arms 35, 35' caused by the sliding of the projections 32, 32' from the innermost cam face 37, 37' to the central cam face 38, 38' of the cam 40 enables the outer contact face portions 46 of the kick levers 44, 45 to engage the notches 34, 34' respectively provided in the arms 35, 35' (FIG. 9). The resulting rocking movement of the kick levers 44, 45 about the shaft 16 causes the pawls 57, 58 to be retracted one respective tooth of the ratchet wheels 3, 8 from the inoperative position O to the operative position I. Similarly, the rollers 51, 52 are brought partially within the reach of cams 53, 54 which rotate with the needle cylinder and actuate the indexing movement of the ratchet wheels 3, 8 through one tooth spacing by movement of the pawls 57, 58 from the position I to position O, and the gradual rotation of both parts 10, 13 of the pattern drum through an angle corresponding to the circumferential spacing of two consecutive axial rows of pins 12, 12' during one revolution of the cylinder 21. The projections 26, 26' of the levers 24, 25 are brought from the recesses 15, 15' to the surface of the corresponding parts 10, 13 of the drum (FIG. 7) by the indexing of the drum parts.

Since the working profiles 60, 60' of the cams 53, 54 are offset by the angle $\alpha$, the roller 52 on the lever 45 first strikes the slope of the cam 54 during rotation of the needle cylinder in the direction of the arrow shown in FIG. 2. The roller 51 of the lever 44 strikes the slope of the cam 53 only later.

Figure 3:
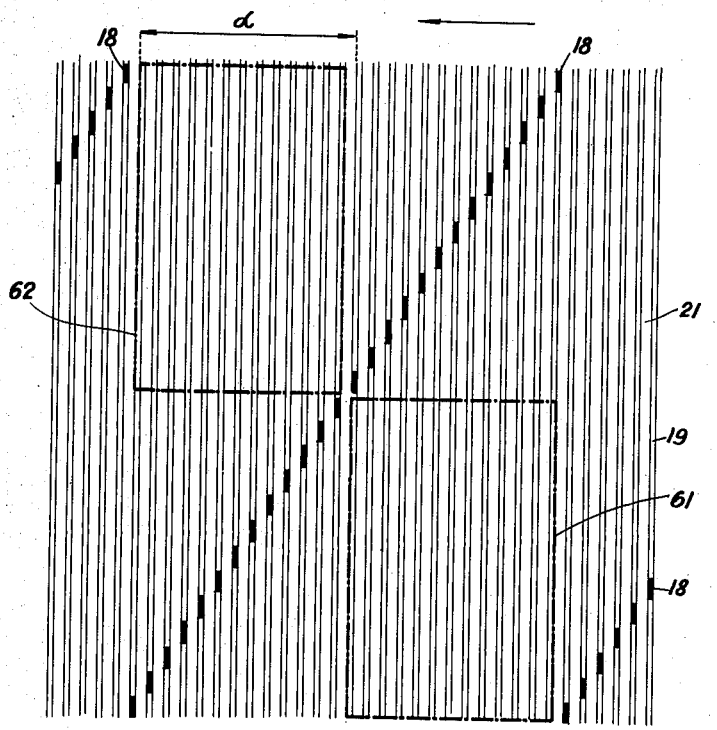
FIG. 3 is a developed elevational partial view of the needle cylinder of the knitting machine of FIG. 1.

The upper part 13 of the drum is thus turned first. The pattern pins 12 provided in said part (FIG. 1) between the indexing control levers 24, 25 according to the required pattern of the hosiery, act upon the cam faces 22 of the upper set of levers 17, whose presser faces 23 (FIG. 4) come to lie between the butts 18 of jacks 19 within the axial length of the upper space 62 (FIG. 3). Upon the delayed engagement of the roller 51, provided on the kick lever 44, with the slope of the cam 53 (FIG. 2), the lower part 10 of the drum is also turned, and the pins 12 mounted in said part abut against the cam faces 22 of the lower set of selector levers 17 whose presser faces come to lie between the butts 18 of the jacks 19 within the axial length of the lower space 61 (FIG. 3). When the jack butts 18 are engaged by the presser faces 23 of the levers 17 (FIG. 4), the jacks 19 are pressed into the grooves 20 of the cylinder 21, and do not actuate the non-illustrated intermediate jacks and needles arranged above the pattern jacks 19, said needles remaining therefore in inoperative position.

In order to produce a smaller pattern in the knitted hosiery it is necessary to leave some vertical rows of openings 11 empty of pins 12 in both parts 10, 13 of the drum or to turn both parts of the drum gradually through an angle corresponding to two axial rows of the pins 12. The impulse for such turning is given by pins 12' (FIG. 1) which are arranged on the level of the recesses 15, 15' in the lower and upper part of the drum. The pins engage the projections 26, 26' of the levers 24, 25 and cause them to pivot about the shaft 16 to a position indicated in dotted lines in FIG. 7. The levers 24, 25 produce a rocking movement of the shafts 29, 31 and of the arms 35, 35' by engagement of their shorter arms with the pins 28, 28' on the crank arms 30, 30' (FIG. 5).

The movement of the arms 35, 35' permits not only their free ends 33, 33' to engage the recesses 48 in the kick levers 44, 45, but also the rollers 51, 52 to come fully within reach of the cams 53, 54 (see FIG. 9, where this position is shown in dotted lines). Due to this movement of the levers 44, 45, the pawls 57, 58 are withdrawn over two teeth of the ratchet wheels 3, 8 from the inoperative position O to the operative position II.

In the course of one revolution of the cams 53, 54, both parts 10, 13 of the drum are gradually turned through an angle corresponding to two axial rows of pins 12, 12′ while the cam 40 remains in the same position.

The momentary stopping of both parts 10, 13 of the drum prior to a temporary interruption of the patterning operation, such as prior to knitting the heel or toe of the stocking, is effected by an angular displacement of the main cam drum, causing a higher step of the operative segment on said main drum to produce rotation of a non-illustrated lever and a pull of the cable 43 in the direction of the arrow (see FIG. 5). The double cam 40 is rotated about its pivot 41 to a position in which the transverse projection 32, 32′ of each arm 35, 35′ is urged by the corresponding spring 36 against the radially outermost cam face 39 of the control cam 40 (FIG. 10). The rotation of the cam 40 and of the arms 35, 35′ prevents the rollers 51, 52 from coming partially or fully within reach of the cams 53, 54 because the inner contact face portions 47 of the kick levers 44, 45 are pressed by the springs 49 against the free ends 33, 33′ of the arms 35, 35′. The rollers 51, 52 of the kick levers 44, 45 are out of reach of the cams 53, 54 and the pawls 57, 58 are in their inoperative position O.

When continuation of the patterning operation is desired, for example, after the heel or toe has been finished, the main cam drum provides again an impulse to pivot the cam 40 from the position shown in FIG. 10 to the position shown in FIG. 9, in which its central cam faces 38, 38′ abut against the projections 32, 32′ of the arms 35, 35′. The resulting rocking movement of the kick levers enables the outer contact face portions 46 of the levers 44, 45 to engage the notches 34 in the arms 35, 35′. The drum parts 10, 13 are again gradually indexed through the spacing of two adjacent rows of pins 12, 12′ during one revolution of the needle cylinder.

When the patterning operation has been completed, both parts 10, 13 of the drum return to their initial position when the main cam drum of the machine causes rotation of the control cam 40 from the position shown in FIG. 9 to the position in which the innermost cam faces 37, 37′ are opposite the transverse projections 32, 32′ of the arms 35, 35′, but without the projections 32, 32′ contacting the cam faces 37, 37′. Since the projections 26, 26′ of the indexing control levers 24, 25 still slide along the surface of the drum parts 10, 13 (FIG. 7) or along the surfaces of the pins 12′, the stepwise rotation of both parts of the drum continues until the projections 26, 26′ of the levers 24, 25 engage the recesses 15, 15′ (FIG. 6). The pivotal movement of the levers 24, 25, as their projections 26, 26′ drop into the recesses 15, 15′, causes also a rotary movement of the arms 35, 35′ until their transverse projections 32, 32′ abut against the innermost cam faces 37, 37′ of the control cam 40 (FIG. 8). The outer contact face portions 46 of the kick levers 44, 45 bear against the free ends 33, 33′ of the arms 35, 35′ under the pressure of the springs 49, the rollers 51, 52 the levers 44, 45 are out of reach of the cams 53, 54, and the pawls 57, 58 are again in their inoperative position.

We claim:

1. In a knitting machine including a needle cylinder, a pattern drum having two coaxial, independently rotatable parts, and means for rotating said needle cylinder and for indexing said drum, the improvement in the means for indexing said drum which comprises
   (a) two coaxial cam means connected to said needle cylinder for joint rotation;
   (b) two motion transmitting means interposed between respective ones of said drum parts and corresponding ones of said cam means for independently actuating indexing movement of said drum parts responsive to the rotation of the corresponding cam means; and
   (c) control means for controlling the response of each of said drum parts to the rotation of the corresponding cam means.

2. In a knitting machine as set forth in claim 1 said cam means each having a radially sloping face, the faces of said cam means being angularly offset about the common axis of said cam means.

3. In a knitting machine as set forth in claim 1, said cam means each having a radially sloping face, said motion transmitting means each including cam follower means, and said control means including means for limiting movement of said cam follower means toward said sloping faces.

4. In a knitting machine as set forth in claim 1, said said cam means each having a radially sloping face, said motion transmitting means each including cam follower means, and said control means including single means for limiting movement of the cam follower means toward said sloping faces.

5. In a knitting machine as set forth in claim 1, said cam means each having a radially sloping face, said motion transmitting means each including cam follower means, and said control means including two independent means for respectively limiting movement of said cam follower means toward said sloping faces.

6. In a knitting machine as set forth in claim 1, said control means including pin means on at least one of said pattern drum parts, and a member engageable with said pin means during indexing movement of said one drum part for displacement by said pin means, said motion transmitting means being responsive to the displacement of said member for varying the indexing of said one drum part when the corresponding cam means rotates.

7. In a knitting machine for the production of patterned hosiery and the like, in combination,
   (a) a rotatable needle cylinder movably carrying a plurality, of pattern forming elements;
   (b) a pattern drum having two independent parts coaxially rotatable and formed with respective rows of openings;
   (c) a plurality of actuating pins inserted in said openings;
   (d) a plurality of lever means engageable with the pins of respective rows and with respective pattern forming elements for moving the latter when said pins rotate with the corresponding drum parts;
   (e) a ratchet wheel secured to each part of said drum;
   (f) two cams on said needle cylinder having respective operative faces angularly offset relative to the axis of said cylinder;
   (g) two pawl means pivotable for actuating engagement with a respective one of said ratchet wheels;
   (h) roller means mounted on each pawl means and engageable with a respective one of said cams for phase-shifted pivotal actuating movement of said pawl means and corresponding indexing movement of said pattern drum parts.

8. In a knitting machine as set forth in claim 7, said roller means being engageable with said cams by movement in a direction radially relative to the axis of said cylinder, and control means for limiting the radial engaging movement of each of said roller means.

9. In a knitting machine as set forth in claim 8, said control means being responsive to the rotary position of the corresponding part of said drum.

References Cited in the file of this patent

UNITED STATES PATENTS

| 2,196,073 | Kent et al. | Apr. 2, 1940 |
| 2,803,121 | Ferraguti | Aug. 20, 1957 |
| 2,962,881 | Williams | Dec. 6, 1960 |